April 1, 1930.  H. MALLOY  1,752,994
PISTON
Filed May 10, 1928
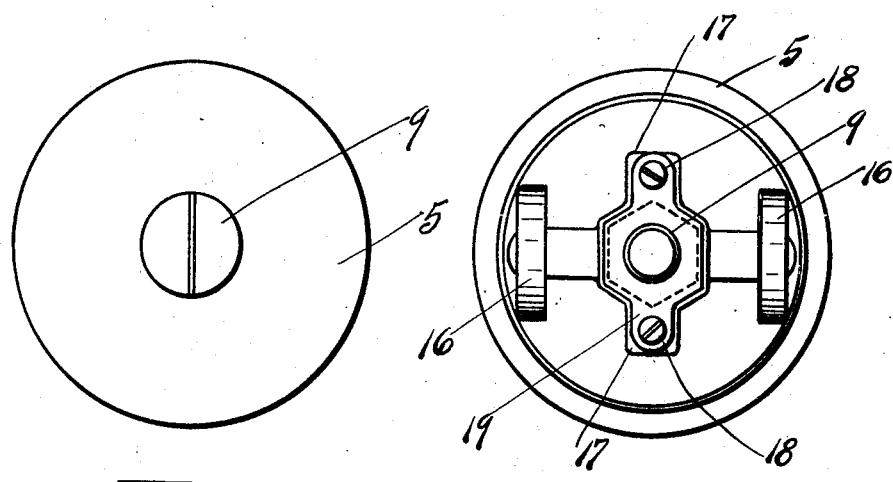
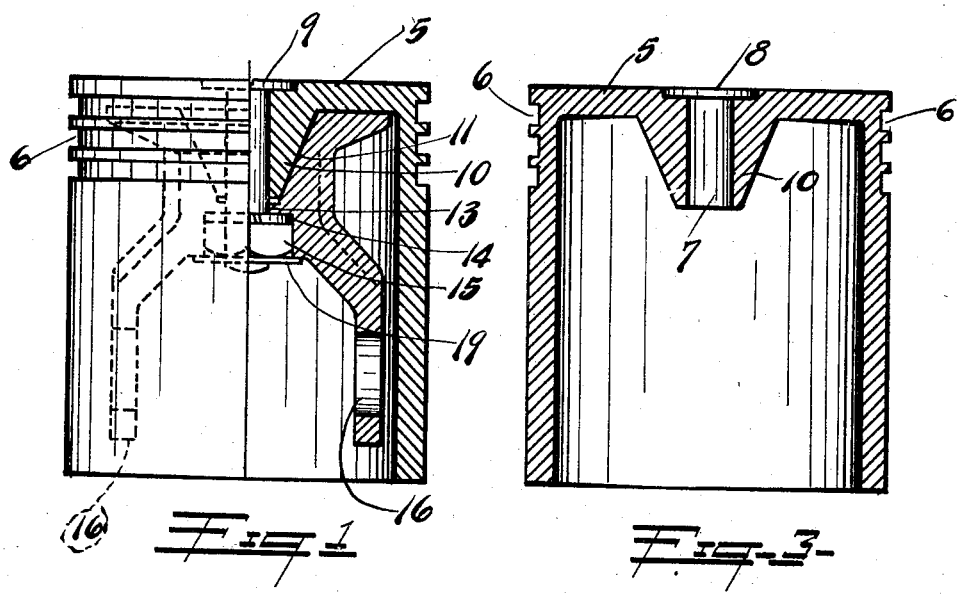
INVENTOR
Howard Malloy.
BY Frank C. Fearman.
ATTORNEY Patented Apr. 1, 1930

1,752,994

UNITED STATES PATENT OFFICE

HOWARD MALLOY, OF ALMA, MICHIGAN

PISTON

Application filed May 10, 1928. Serial No. 276,604.

This invention relates to pistons and has special references to a built up piston, such as used in internal combustion engines, which when the head and side walls thereof are worn, burned, scored, or for any reason unsatisfactory and unfit, can be easily and quickly removed, and a new head substituted therefor, with a minimum of time and labor.

The prime object of the invention is to design a built up piston, which when assembled and connected, provides a rigid and solid unitary structure, and from which the outer shell can be readily removed.

Generally where a piston is burned, scored, or for some other reason unfit for service, the entire structure must be discarded, with my improved construction the thin outer shell only need be discarded, and this can be removed by unskilled labor by use of a common screw driver.

With the above and other objects in view, the present invention consists in the combination and arrangement of parts, hereinafter more fully described, illustrated in the accompanying drawing, and particularly pointed out in the appended claim, it being understood that changes may be made in the form, size, proportion, and minor details of construction, without departing from the spirit or sacrificing any of the advantages of the invention.

In the drawing:

Fig. 1 is a part sectional side view showing the piston assembled.

Fig. 2 is a top plan view.

Fig. 3 is a vertical sectional view of the shell.

Fig. 4 is an inverted plan view of the assembled piston.

Referring now to the drawing in which I have shown the preferred embodiment of my invention, the numeral 5 indicates the head and shell of the piston, which is provided with piston ring grooves 6 in the usual manner, and is further formed with a centrally disposed opening 7, counterbored as shown at 8, to receive the bolt 9.

An inwardly projecting conical shaped shoulder 10 is cast integral with the shell, the outer surface of the shoulder being turned and finished, and when the piston is assembled, is adapted to seat in and fit a depression 11 formed in the core 12 and which is turned to receive it, said core being also centrally bored as shown at 13 to accommodate the lower threaded end of the bolt 9, the lower end of said opening being counterbored to receive a washer 14, together with a nut 15, and by means of which shell is rigidly secured on the core.

Spaced apart downwardly depending legs 16 are cast integral with the core, and are suitably bored to form bearings for the connecting rod pin (not shown), diametrically opposite lugs 17 being also cast integral therewith, and are drilled and threaded to receive the screws 18, which secure the sheet metal plate 19 in position, this plate covering and holding the nut 15 from displacement when the bolt 9 is removed. I wish to direct particular attention to the fact that the nut 15 is not subjected to the fire and heat of the explosions, and oil from the engine crank case is continuously splashing on the nut, consequently the bolt can be readily removed.

From the foregoing description it will be obvious that I have perfected a very simple and practical built up piston, the head of which is self centering, and which can be very cheaply manufactured and assembled.

What I claim is:—

A piston comprising a core formed with a centrally disposed depression, and spaced apart legs having bearings formed therein, a self centering shell mounted on said core, and formed with a centrally disposed conical shaped shoulder adapted to snugly fit in said depression, a bolt for securing the shell on the core, the lower end of said core being counterbored to accommodate a lock washer and nut, and a plate detachably secured to the core for preventing displacement of said nut.

In testimony whereof I hereunto affix my signature.

HOWARD MALLOY.